United States Patent [19]
Swift et al.

[11] Patent Number: 5,329,980
[45] Date of Patent: Jul. 19, 1994

[54] ASYMMETRIC TIRE TREAD WITH TWO AQUACHANNELS

[75] Inventors: Douglas A. Swift, Hudson; John J. Taube, Tallmadge, both of Ohio

[73] Assignee: The Goodyear Tire & Rubber Company, Akron, Ohio

[21] Appl. No.: 29,839

[22] Filed: Mar. 11, 1993

[51] Int. Cl.$^5$ ............................................. B60C 11/11
[52] U.S. Cl. ................................ 52/209 R; 152/209 A
[58] Field of Search .......... 152/209 R, 209 D, 209 A; D12/146–151

[56] References Cited

U.S. PATENT DOCUMENTS

| | | | |
|---|---|---|---|
| 4,700,862 | 10/1987 | Landers | 152/209 R |
| 4,953,604 | 9/1990 | Shepler et al. | 152/209 A |
| 5,002,109 | 3/1991 | Shepler et al. | 152/209 A |
| 5,176,766 | 1/1993 | Landers et al. | 152/209 R |

FOREIGN PATENT DOCUMENTS

| | | | |
|---|---|---|---|
| 0139606 | 5/1985 | European Pat. Off. | 152/209 D |
| 1480462 | 6/1969 | Fed. Rep. of Germany . | |
| 2536470 | 2/1977 | Fed. Rep. of Germany . | |
| 3723368 | 3/1989 | Fed. Rep. of Germany ... | 152/209 R |
| 6055607 | 4/1985 | Japan . | |

Primary Examiner—Caleb Weston
Assistant Examiner—Nancy T. Krawczyk
Attorney, Agent, or Firm—Bruce J. Hendricks

[57] ABSTRACT

The tire treads are divided circumferentially into first, second, and third zones. The edge between each of the three zones in the tire treads are in the center of an aquachannel. The tires have a tread groove pattern that is asymmetric in character.

7 Claims, 3 Drawing Sheets

ASYMMETRIC TIRE TREAD WITH TWO AQUACHANNELS

BACKGROUND OF THE INVENTION

1. Field of Invention

This invention relates to an asymmetric tire tread having two aquachannels designed for four-wheeled automotive vehicles.

2. Description of the Prior Art

In automotive vehicles, proper traction between the tire and the road surface is necessary for effective operation of the vehicle. Under certain weather conditions, such as rain, the traction of the tire on the road surface can be impaired. For example, a vehicle traveling on a rain-soaked road surface at high speed can "hydroplane" and lose contact with the road surface altogether. For this reason, it is desirable that tires be able to channel water away from the footprint of the tire to ensure good traction between the tire and road surface. U.S. Pat. No. 4,545,415 discloses a tire tread designed to provide good traction on slippery road surfaces.

A second problem is that four-wheeled vehicles are usually fitted with identical tires at all four wheel positions even though the operating conditions and performance requirements at each wheel may be different. For example, the functions necessarily performed by each tire, such as steering, load bearing, and transmitting driving torque from the engine to the road surface are usually different at each wheel position.

Some tire designers have sought to maximize vehicle performance by tuning each tire to its wheel position. German Patent 1,480,962 discloses a front and rear tire combination in which the compound in the front tire is different from that in the rear tire, the combination designed to improve treadwear. German Patent 2,536,470 discloses a front and rear tire combination in which the tread pattern on the front tire is varied slightly from the tread pattern on the rear tire to limit the noise generated by the combination. Japanese Patent 58-164360 discloses a front and rear tire combination in which the tread pattern of the front tire differs from that of the rear tire in order to maximize the cornering characteristics of the vehicle.

U.S. Pat. No. 4,984,616 discloses tire/vehicle system for an automotive vehicle. Whereas the use of such tires on dry pavement has met with immense success, there is still unacceptable traction on wet surfaces.

SUMMARY OF THE INVENTION

The invention disclosed and claimed herein is the result of considering the difference in wet road conditions and dry road conditions. Whereas the tire of the present invention may be used on either the front or rear of the vehicle, preferably the claimed tire is used on the drive wheels.

The tires of the present invention have a grooved tread and are divided circumferentially into three zones. The tire tread is characterized by two aquachannels, one aquachannel located in the center of the edge between the first and second zone and the second aquachannel located between the second and third zone.

BRIEF DESCRIPTION OF THE DRAWINGS

Other aspects of the invention will become apparent from the following description when read in conjunction with the accompanying drawings wherein.

DESCRIPTION OF THE PREFERRED EMBODIMENTS

Figure 1:
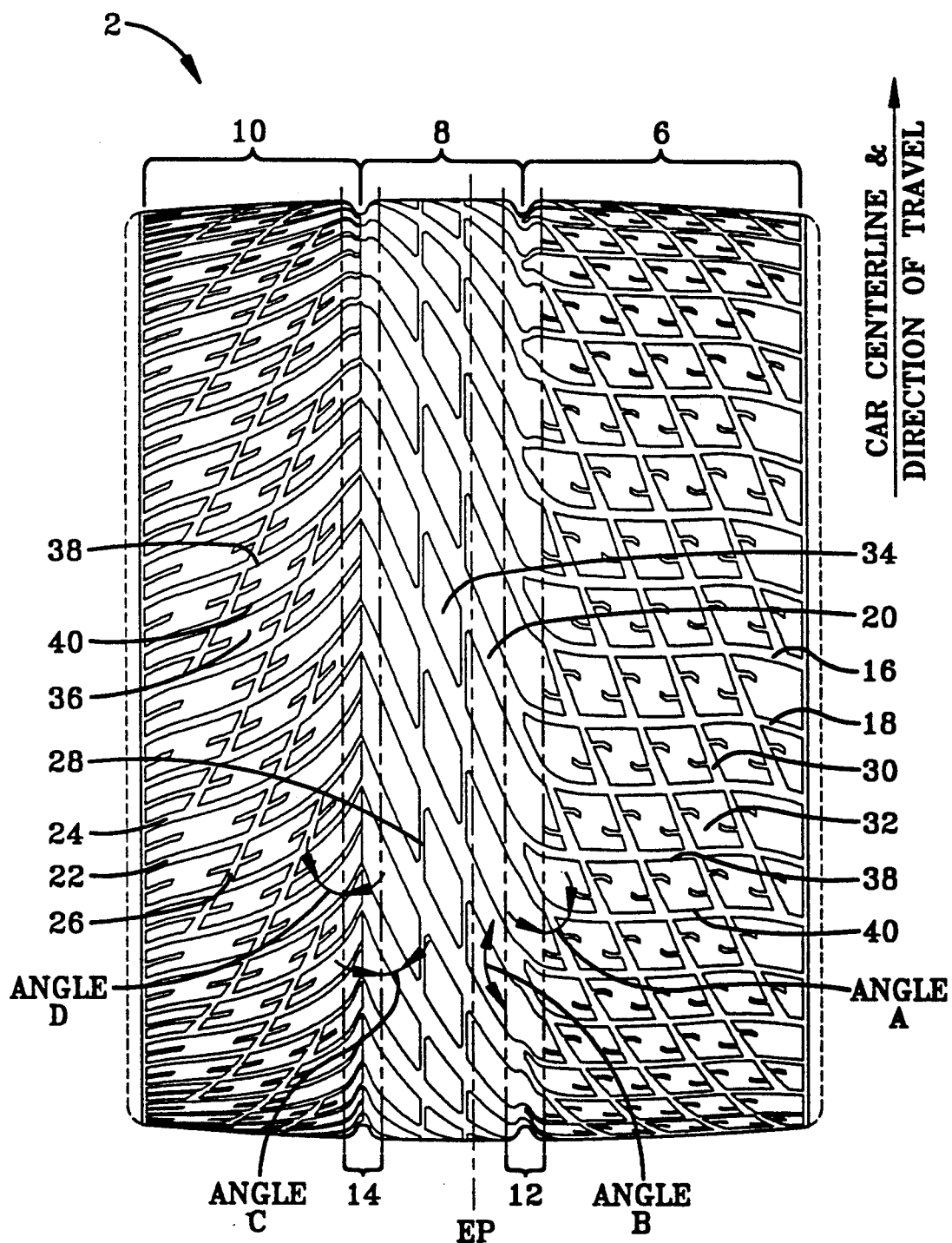
FIG. 1 is a plan view of a tire tread of one embodiment of the invention for use on the left side of a vehicle.

The invention also may be better understood in the context of the following definitions, which are applicable to both the specification and to the appended claims:

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Equatorial plane (EP)" means the plane perpendicular to the tire's axis of rotation and passing through the center of its tread.

"Aquachannel" refers to an extra wide circumferential groove with angle (non-parallel), rounded groove walls designed specifically to channel water out of the footprint of the tire.

"Casing" means the carcass, belt structure, beads, sidewalls, and all other components of the tire excepting the tread and undertread. The casing may be new, unvulcanized rubber or previously vulcanized rubber to be fitted with a new tread.

"Tread" means a molded rubber component which, when bonded to a tire casing, includes that portion of a tire that comes into contact with the road when the tire is normally inflated and under normal load.

"Tread width" means the arc length of the tread surface in the axial direction, that is, in a plane passing through the tire's axis of rotation.

"Footprint" means the contact patch or area of contact of the tire tread with a flat surface under normal load and pressure or under specified load, pressure and speed conditions.

"Net-to-gross ratio" means the ratio of the area of the tire tread rubber that makes contact with the road surface while in the footprint, divided by the area of the tread in the footprint, including non-contacting portions such as grooves.

"Groove" means an elongated void area in a tread that may extend circumferentially or laterally about the tread in a straight, curved, or zigzag manner. Circumferentially and laterally extending grooves sometimes have common portions. The "groove width" is equal to tread surface are occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Axial" and "axially" are used herein to refer to lines or directions that are substantially parallel to the axis of rotation of the tire.

"Radial" and "radially" are used herein to mean directions radially toward or away from the axis of rotation of the tire.

"Year-round" means a full calendar year through each season. For example, a snow tire is not designed for year-round use since it creates objectionable noise on dry road surfaces and is designed to be removed when the danger of snow is passed.

Figure 2:
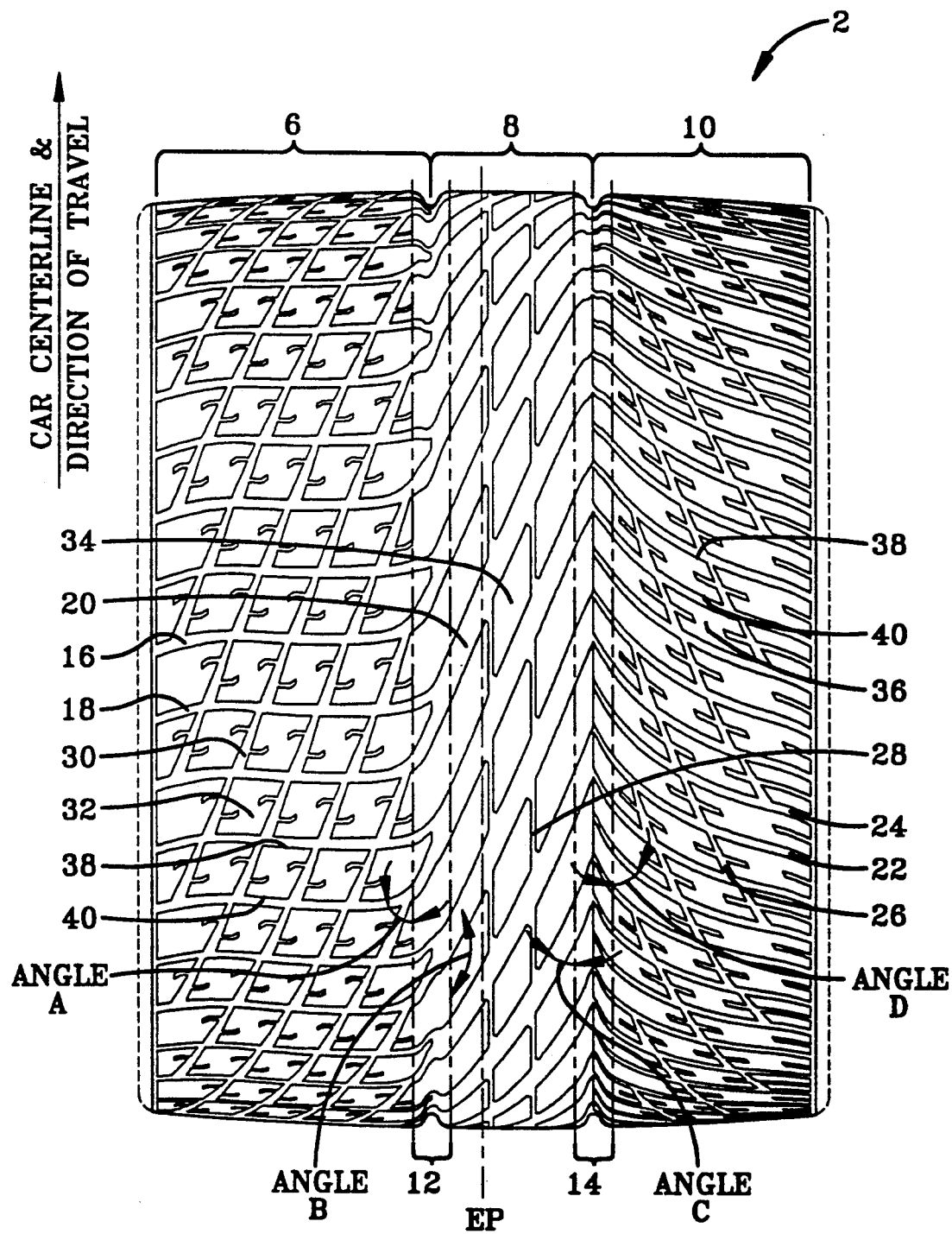
FIG. 2 is a plan view of a tire tread of one embodiment of the invention for use on the right side of a vehicle.

In the drawings, the same numerals are used for the same components or items in the several views. With particular reference now to FIGS. 1 and 2, there is illustrated a tire 2 according to the present invention. Throughout the present specification, a number of angles are described. All angles are measured in the intended forward direction of travel.

While the tire shown in FIGS. 1 and 2 are designed primarily for use in racing on wet tracks, the scope of the invention is not limited to race tires and have numerous applications including high performance tires.

With reference to FIGS. 1 and 2, in the normal mode of operation, the vehicle on which the tire is mounted is driven in the direction of the arrow. Although the vehicle may be driven in the opposite direction, for example, when parking.

With reference to FIGS. 1 and 2, each tire 2 is characterized by three circumferentially extending zones 6 (the first zone), 8 (the second zone), 10 (the third zone). The first, second, and third zones 6, 8, 10 of the tire 2 extend circumferentially about the tire so that the edges of the zones are parallel to the equatorial plane EP of the tire and the second zone 8 is disposed between the first zone 6 and the third zone 10. The edge between the first zone 6 and the second zone 8 is in the center of a first aquachannel 12. The edge between the second zone 8 and the third zone 10 is in the center of a second aquachannel 14.

The width of the first zone 6 is between 35% and 48% of the tread width of the tire 2, 4. Preferably, the width of the first zone 6 is between 40% and 45%. The width of the second zone 8 is between 20% and 30% of the tread width of the tire. Preferably, the width of the second zone 8 is between 22% and 27%. The width of the third zone 10 is between 25% and 40% of the tread width of the tire. Preferably, the width of the third zone 10 is between 30 and 36%.

The width in centimeters of the first zone 6, second zone 8, and the third zone 10 may vary depending on the size of the tire. For example, the width of the first zone 6 may range from about 10 to 18 centimeters. Preferably, the width of the first zone 6 ranges from about 12 to 16 centimeters. The width of the second zone 8 may range from about 4 to 12 centimeters. Preferably, the width of the second zone 8 ranges from 6 to 10 centimeters. The width of the third zone 10 may range from about 6 to 15 centimeters. Preferably, the width of the third zone 10 ranges from about 9 to 13 centimeters.

The first zone 6 has substantially aligned lateral wide groove segments 16, 18 which extend across the width of the first zone 6. These lateral wide groove segments have center lines which form angles between 30 and 80 degrees when measured at the point when it merges with the first aquachannel 12 and measured in the intended forward direction of travel. See Angle A. Preferably, these lateral wide groove segments have centerlines which form angles between 40 degrees and 75 degrees.

The second zone 8 has a plurality of wide groove segments 20 laterally extending from the first aquachannel 12 across the second zone 8 to the second aquachannel 14. The lateral wide groove segments 20 of the second zone 8 have centerlines which form an angle of between 155 and 170 degrees at the point when it merges with the first aquachannel 12, as measured in the intended forward direction of travel. See Angle B and an angle of from between 10 degrees and 25 degrees at the point when the wide grooves 20 merge with the second aquachannel 14, as measured in the intended forward direction of travel. See Angle C. Preferably, the wide groove segments 20 in the second zone 8 have centerlines which form an angle of between 157 degrees and 163 degrees at the point where the centerline merges with the first aquachannel 12 and an angle of between 17 degrees and 23 degrees where the centerline merges with the second aquachannel 14.

The third zone 10 has a plurality of laterally extending wide groove segments 22 extending axially outward from said second aquachannel 14 across the width of the third zone 10 to the nearest tread edge 24. Each laterally extending wide groove 22 in the third zone 10 is oriented such that the centerline of the groove 22 forms an angle between 25 degrees and 40 degrees at the point where it merges with the second aquachannel 14 and measured in the intended forward direction of travel. See Angle D. Preferably, the angle is between 30 degrees and 8 degrees. The primary purpose of the first zone 6 is longitudinal traction during acceleration. The primary purpose of the third zone 10 is lateral traction for cornering and to prevent sliding. The nearly perpendicular relationship between the grooves 20 of the second zone 8 is designed to inhibit lateral sliding of the tires 2, 4 during turns while continuing to provide good longitudinal traction for acceleration.

The tire tread has other wide groove segments 26, 28, 30 which intersect the lateral wide groove segments 16, 18, 20, 22 to form blocks 32, 34, 36. The blocks in the first zone 6 and third zone 10 have a leading edge 38 and a trailing edge 40. The leading edge 38 of the blocks contacts the road surface prior to the trailing edge of the blocks when the tire is rotating in its forward direction. The leading edge of the blocks in the first zone 6 and the third zone 10 are wider than the trailing edge of the blocks in the first zone 6 and the third zone 10. In the preferred embodiment, the tire is used on the drive wheels of the vehicle and the leading edge of the blocks assist in improving longitudinal traction during acceleration. The blocks in the first zone 6 are shaped like trapezoids and the blocks in the second zone 8 and third zone 10 are shaped like parallelograms.

Figure 3:
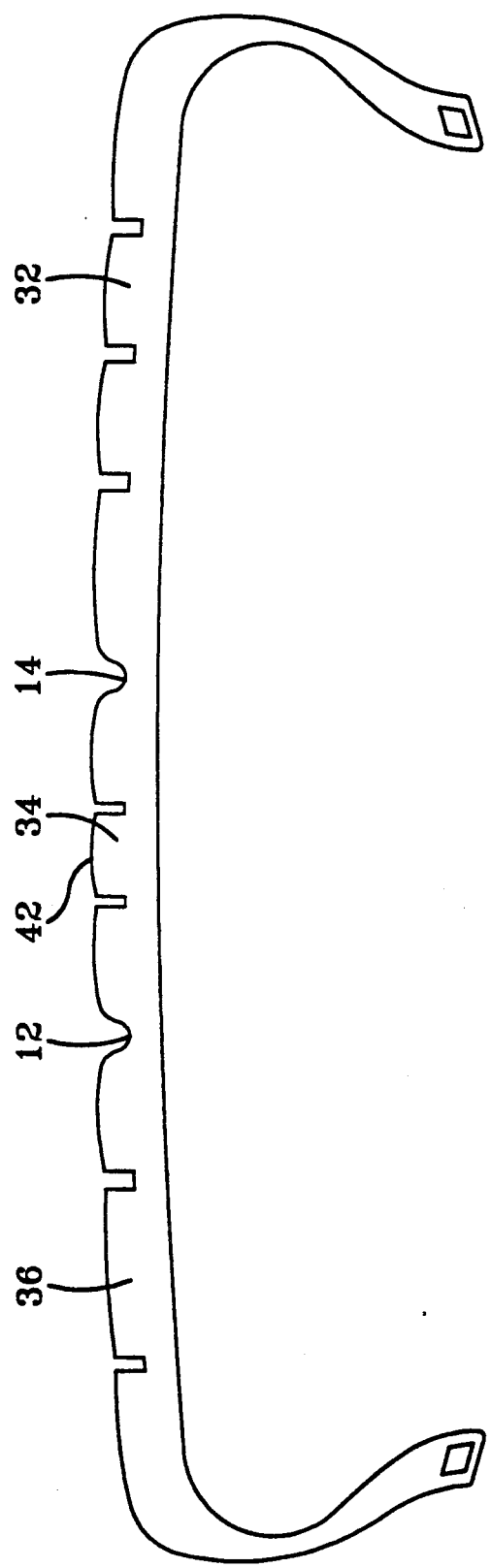
FIG. 3 is a cross-sectional view of a tire according to one embodiment of the invention.

With reference to FIGS. 1-3, the tires are further characterized by varying net-to-gross ratios in each of the zones. The tread's net-to-gross ratio must be low enough to ensure that the tread's void areas can accommodate any water on the road surface. With reference to FIG. 3, when the two aquachannels 12, 14, grooves and other void areas are properly sized, as the tire enters the footprint, water is channeled out of the footprint by the void areas, enabling the radially outermost surface 42 of the tread blocks 32, 34, 36 to make contact with the road surface. If the void areas are too small, a portion of the water is trapped between the blocks and the road surface. This results in unacceptable tire traction and vehicle handling. The radially outermost surface 42 of the blocks are convexly curved in the radially outward direction. In the preferred embodiment, this curvature is in the axial direction only; the circumferential direction has no curvature apart from the usual curvature associated with a round tire. The curvature of the surface of the element helps move water from the center of the block to the tread groove. The curvature shown in FIG. 3 is exaggerated for clarity. This crowning helps prevent water being trapped between the block and the road surface.

On the other hand, if the tire tread has a net-to-gross ratio that is too low, tire traction, especially peak traction, and treadwear will be lowered. With reference to FIGS. 1 and 2, in a tire tread with a low net-to-gross ratio, the blocks 32, 34, 36 of the tread must bear a correspondingly greater percentage of the vehicle load. This higher loading of individual tread blocks lowers the treadwear of the tire. Additionally, blocks in a low net-to-gross ratio tread deflect more due to the higher loading. This additional deflection is undesirable for handling, especially under hard cornering.

The net-to-gross ratios of the individual zones in the tire my vary. In tires according to the preferred embodiment, the net-to-gross ratio of each zone in the tire tread is different from the other zones in such tire. The first zone 6 of a tire tread 16, 18 according to the present invention has a net-to-gross between 55% and 70%, with the preferred embodiment being from 60 to 65%. The second zone 8 of the tire 2, 4 according to the preferred embodiment has a net-to-gross ratio between 38% and 48%, with the currently preferred embodiment ranging from 40 to 45%. The third zone 10 of the tire according to the present invention has a net-to-gross ratio between 50% and 66%, with the preferred net-to-gross ratio ranging from 55% to 62%.

What is claimed is:

1. An asymmetric tire tread when in an annular configuration for a tire comprising first, second, and third circumferentially extending zones, said zones having edges which are parallel to the equatorial plane of the tire and said edge between the first zone and second zone is in the center of a first aquachannel and said edge between the second zone and third zone is in the center of a second aquachannel, the second zone being disposed between the first zone and the third zone, (1) said first zone having a width of between 35 percent and 48 percent of the width of said tire tread, said first zone having a net-to-gross ratio between 55 percent and 70 percent, a plurality of substantially laterally extending wide grooves extending inward from said first aquachannel to the nearest tread edge, each laterally extending wide groove having a centerline being oriented such that the centerline forms an angle of between 30 degrees and 80 degrees at a point where the centerline merges with the first aquachannel;

(2) the width of the second zone being between 20 and 30 percent of the width of said tire tread, said second zone having a net-to-gross ratio between 38 percent and 48 percent, a plurality of wide grooves laterally extending from said first aquachannel across said second zone to the second aquachannel, said wide grooves in the second zone having a centerline being oriented such that the centerline forms an angle of between 155 degrees to 170 degrees at the point the centerline merges with the first aquachannel and an angle of from between 10 degrees to 25 degrees at the point where the centerline merges with said second aquachannel;

(3) the width of the third zone being between 25 and 40 percent of the width of said tire tread and having a net-to-gross ratio between 50 percent and 66 percent with a plurality of laterally extending wide groove segments extending axially outwardly from said second aquachannel to the nearest tread edge, each laterally extending wide groove having a centerline being oriented such that the centerline forms an angle between 25° and 40° at the point where the centerline merges with the second aquachannel.

2. The tire tread of claim 1 wherein the net-to-gross ratio of the first zone ranges from 60% to 65%, the net-to-gross ratio of the second zone ranges from 40% to 45%, and the third zone ranges from 55% to 62%.

3. The tire tread of claim 1 wherein the width of the first zone ranges from 10 to 18 cm., the width of the second zone ranges from 4 to 12 cm. and the width of the third zone ranges from 6 to 15 cm.

4. The tire tread of claim 1 wherein said first zone has a width of between 40 to 45 percent of the width of the tire tread, said second zone has a width of between 22 to 27 percent of the width of the tire tread, and said third zone has a width of between 30 to 36 percent of the width of the tire tread.

5. The tire tread of claim 1 wherein each lateral wide groove in the first zone having a centerline being oriented such that the centerline forms an angle of between 40 degrees and 75 degrees, each lateral wide groove in the second zone having a centerline being oriented such that the centerline forms an angle of between 157 degrees and 163 degrees at the point where the centerline merges with the first aquachannel and an angle of between 17 degrees and 23 degrees where the centerline merges with the second aquachannel, and each lateral wide groove in the third zone having a centerline being oriented such that the centerline forms an angle of between 30° and 36° at the point where the centerline merges with the second aquachannel.

6. The tire tread of claim 1 wherein wide groove segments in the first and third zones intersect said laterally extending wide grooves to form blocks having leading and trailing edges, the leading edges of the blocks in the first and third zone being wider than the trailing edges of the blocks of the first and third zone.

7. The tire tread of claim 1 wherein the width of the first zone ranges from 12 to 16 cm., the width of the second zone ranges from 6 to 10 cm., and the width of the third zone ranges from 9 to 13 cm.

* * * * *